(12) United States Patent
Deng

(10) Patent No.: US 9,558,572 B2
(45) Date of Patent: Jan. 31, 2017

(54) VISUALIZATION OF DATA CLUSTERS

(71) Applicant: Chang Deng, Vancouver (CA)

(72) Inventor: Chang Deng, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 64 days.

(21) Appl. No.: 14/574,817

(22) Filed: Dec. 18, 2014

(65) Prior Publication Data

US 2016/0180556 A1   Jun. 23, 2016

(51) Int. Cl.
G06F 17/30 (2006.01)
G06T 11/20 (2006.01)

(52) U.S. Cl.
CPC ....... *G06T 11/206* (2013.01); *G06F 17/30572* (2013.01); *G06T 11/20* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2003/0218611 A1* | 11/2003 | Ben-Tovim ........... | G06T 11/206 345/440 |
| 2009/0013281 A1* | 1/2009 | Helfman ........... | G06F 17/30572 715/788 |
| 2009/0287356 A1* | 11/2009 | Dunne ............... | G01N 15/1427 700/282 |
| 2010/0231594 A1* | 9/2010 | Hao .................. | G06F 17/30572 345/440 |

FOREIGN PATENT DOCUMENTS

GB    2458646 A  *  9/2009  ....... G06F 17/30572

OTHER PUBLICATIONS

Wikipedia contributors, 'Cluster analysis', Wikipedia, The Free Encyclopedia, Nov. 28, 2014, 09:30 UTC, <http://en.wikipedia.org/w/index.php?title=Cluster_analysis&oldid=635752641> [accessed Dec. 9, 2014].

* cited by examiner

Primary Examiner — Ryan M Gray
(74) Attorney, Agent, or Firm — Fish & Richardson P.C.

(57) ABSTRACT

The disclosure generally describes computer-implemented methods, software, and systems, including a method for presenting information. A first graph is presented that represents plural groups, each representing an aggregated set of data points grouped based on a first set of common attributes. User input selecting a particular group is received. The aggregated set of data points is analyzed to determine whether the number of aggregated set of data points exceeds a threshold. In response to determining that the number exceeds the threshold, the aggregated set of data points is re-grouped. A second set of common attributes associated with the re-grouped set of data points is identified. The data points are aggregated based on the second set of common attributes. A second graph is provided for presentation, the updated graph representing plural groups, each group representing an aggregated subset of data points from the aggregated set of data points.

18 Claims, 5 Drawing Sheets

VISUALIZATION OF DATA CLUSTERS

BACKGROUND

The present disclosure relates to information presentation.

Some reporting applications includes graphing, charting and/or other functions and tools that can be used to present data to a user in a more visually appealing way. For example, visualizations can be used instead of, or in addition to, a presentation of the data in a textual or tabular layout. As the user's data set grows, however, the visualization may present more information than the user can process. When data sets become larger and larger, and as computer technologies advance, using a visualization to present data in a useful way can become more challenging.

SUMMARY

The disclosure generally describes computer-implemented methods, software, and systems for information presentation. For example, a first graph is presented for presentation. The first graph represents a plurality of groups, each group representing an aggregated set of data points grouped based on a first set of common attributes. User input selecting a particular group of the plurality of groups is received. The aggregated set of data points represented by the selected group is analyzed to determine whether the number of aggregated set of data points exceeds a threshold number. In response to determining that the number of aggregated set of data points exceeds the threshold number, the aggregated set of data points is re-grouped. A second set of common attributes associated with the re-grouped set of data points is identified. The data points are aggregated based on the second set of common attributes. A second graph is provided for presentation, the updated graph representing a plurality of groups, each group representing an aggregated subset of data points from the aggregated set of data points.

One computer-implemented method includes: providing a first graph for presentation, the first graph representing a plurality of groups, each group representing an aggregated set of data points grouped based on a first set of common attributes; receiving user input selecting a particular group of the plurality of groups; analyzing the aggregated set of data points represented by the selected group to determine whether the number of aggregated set of data points exceeds a threshold number; and in response to determining that the number of aggregated set of data points exceeds the threshold number, re-grouping the aggregated set of data points, wherein re-grouping the aggregated set of data points includes: identifying a second set of common attributes associated with the re-grouped set of data points; aggregating the data points based on the second set of common attributes; and providing a second graph for presentation, the second graph representing a plurality of groups, each group representing an aggregated subset of data points from the aggregated set of data points.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the threshold number of data points is a predetermined number of values or an optimized group number determined by an algorithm and using the data points.

In a second aspect, combinable with any of the previous aspects, the method further includes, in response to determining that the number of aggregated set of data points does not exceed the threshold number, providing an updated graph for presentation, the second graph representing the data points associated with the selected particular group.

In a third aspect, combinable with any of the previous aspects, aggregating the set of data points includes aggregating the set of data points based on one or more clustering algorithms.

In a fourth aspect, combinable with any of the previous aspects, the one or more clustering algorithms are selected from a group comprising: a k-means clustering algorithm; a mean values clustering algorithm, including clustering centered on a centroid; and a common attributes clustering algorithm, including grouping data points by a common attribute.

In a fifth aspect, combinable with any of the previous aspects, each group of the plurality of groups in the second graph includes a distinct subset of the data points, including identifying each subset using one or more of a logical division of the data points, a certain number of data points, or a maximum number of data points.

In a sixth aspect, combinable with any of the previous aspects, at least one group of the plurality of groups includes a set of outliers as compared to the other groups.

In a seventh aspect, combinable with any of the previous aspects, the second set of common attributes is different than the first set of common attributes.

In an eighth aspect, combinable with any of the previous aspects, further comprising a dynamic update, including: receiving an indication that a first group in the second graph is selected; identifying changes to data points included in the first group after presentation of the second graph; updating parameters of the first group based on the changes; and providing a third graph for presentation, the third graph based on the second graph, modified using the updated parameters.

In a ninth aspect, combinable with any of the previous aspects, the first graph is generated based on a set of data points, wherein the data points are aggregated based on a first grouping algorithm, and wherein aggregating the values based on the second set of common attributes is based on a second grouping algorithm different than the first, the method further comprising generating initial information, including generating initial information based on an underlying data set and using a user-defined clustering algorithm or a default algorithm to cluster data points in the underlying data set.

The subject matter described in this specification can be implemented in particular implementations so as to realize one or more of the following advantages. First, data points can be grouped or clustered into logical groups and/or a number of groups that can be easily comprehended and operated on by a user. Second, the user can set preferences as to how the information is to be presented, including a maximum number of groups, sub-groups, and/or resulting data points that are allowed to be displayed at one time.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
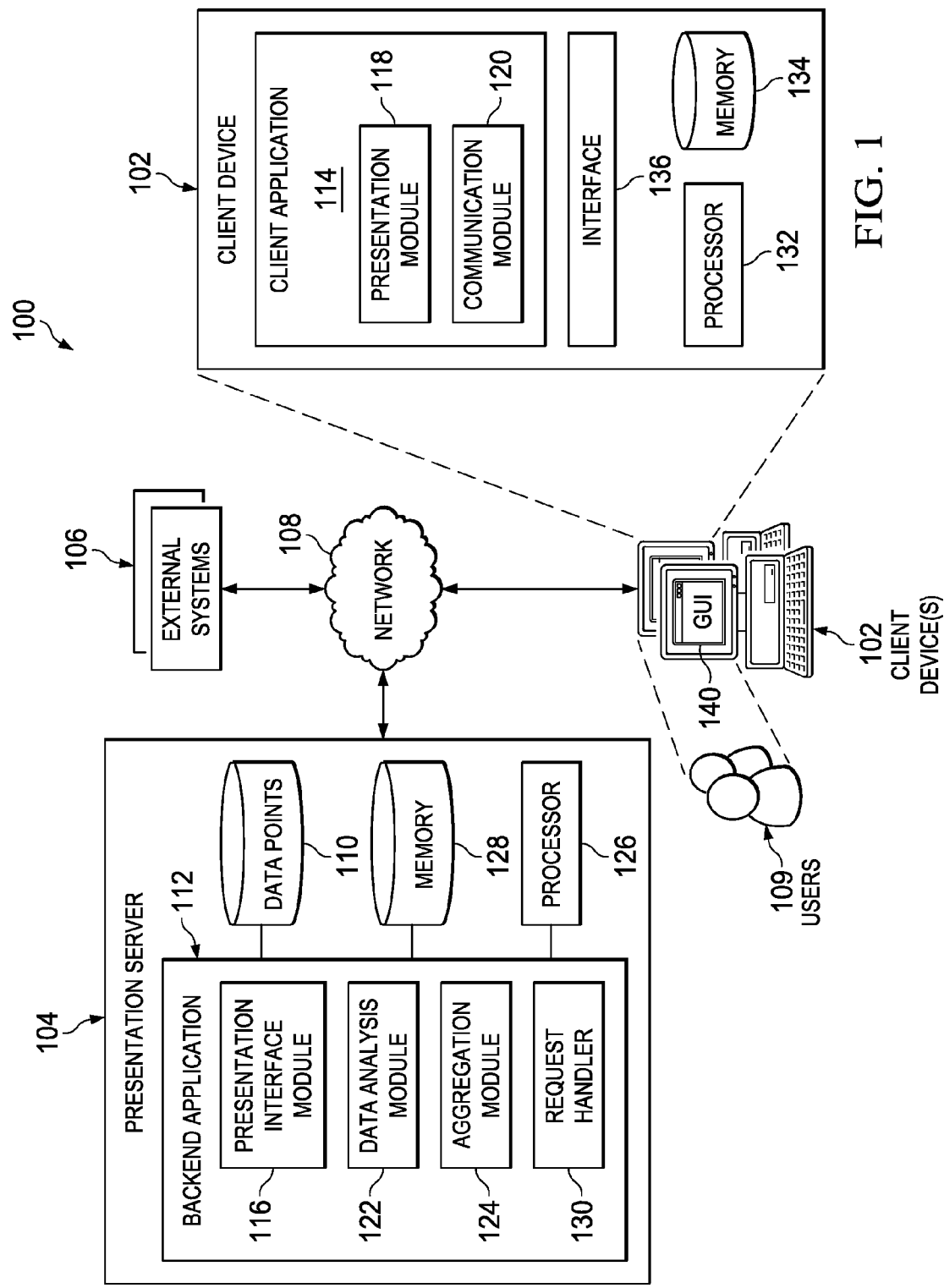
FIG. 1 is a block diagram illustrating an example environment for providing information presentation.

This disclosure generally describes computer-implemented methods, software, and systems for information presentation. For example, the methods, software, and systems described herein can be used in (or in association with) reporting software (e.g., including business intelligence (BI) software) that helps users mine data, discover insight, design and format information retrieved from data sources, such as one or more databases. Some reporting/BI software may include, for example, visualization and charting functions that can provide a more visually appealing presentation than textual or tabular layout of the data. As a user's data set becomes bigger and bigger, however, it can become more challenging to use visualization to present data in a meaningful and/or digestible way. For example, having significantly many data entries can be a challenge in presenting a single visualization, as displaying large numbers of data points may not provide intelligent information to the user. In another example, when using a visualization as the format for supporting a user's (e.g., designer's) data discovery, it may be difficult for the user to do any discovery or analysis.

In some implementations, challenges associated with providing visualizations for data sets (e.g., including large numbers of data points) can be solved by grouping (or clustering) data points and presenting the visualization as a series of visualizations. For example, each successive visualization can present data at an increasingly lower level, based on the user's selection at the previous level. Some implementations can use various clustering algorithms, such as k-means clustering algorithms, chosen for grouping large numbers of data points into clusters. Using clustering techniques, for example, as the data is presented to the user, the presentation can be limited to a number of groups that the user has defined or a number that has been selected as a manageable complexity.

In some implementations, to enable further discovery and analysis on data presented in a visualization, drill-down capabilities can be provided with the visualization. For example, when a small number of data points exists for a cluster for which the drill-down function is selected, the visualization can be updated to show only the data of the current cluster (as described below with reference to FIG. 2). In another example, upon drilling down, all ancestors can still be presented on the visualization (as described below with reference to FIG. 5).

Although example visualizations are described that use bar graphs (e.g., bar charts), other types of visualizations can be used, such as pie charts, line graphs, and/or other formats. Users can also be presented with options to display the data points and/or clusters as table entries or spreadsheet entries. In some implementations, users can be presented with controls to switch among various ways of presenting the data (e.g., bar graphs to pie charts to tables). Various visual techniques can be used, including using different colors, fonts, shading, and/or other techniques. In some implementations, input boxes and/or slider controls can be available to the user to define parameters that control cluster sizes and numbers, and/or to control how the visualizations are to be presented. Users can use the visualizations to identify, for example, best performers, worst performers, interesting data points, and or other specific information.

FIG. 1 is a block diagram of an example environment 100 for providing information presentation. Specifically, the illustrated environment 100 includes, or is communicably coupled with, plural client devices 102, a presentation server 104, and one or more external systems 106, connected using a network 108. For example, the environment 100 can be used to present information on the plural client devices 102 using information available from the presentation server 104. One or more users 109, for example, can provide inputs and/or make selections on the client device 102 that affect how the information is presented.

At a high level, the presentation server 104 comprises an electronic computing device operable to collect, store and provide access to information for use by the client device 102. A data store of data points 110, for example, can include data points generated by the presentation server 104 and/or collected from various sources, including external systems 106. For example, the data points 110 may be related to business applications, such as information related to sales, purchases, distribution, inventory, assets, and/or other types of information associated with business objects and/or enterprise solutions. In some implementations, data points 110 can be include data received from, or stored at, the one or more external systems 106.

As used in the present disclosure, the term "computer" is intended to encompass any suitable processing device. For example, although FIG. 1 illustrates a single presentation server 104, the environment 100 can be implemented using two or more presentation servers 104, as well as computers other than servers, including a server pool. Indeed, the presentation server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated presentation server 104 may be adapted to execute any operating system, including Linux, UNIX, Windows, Mac OS®, Java™, Android™, iOS or any other suitable operating system. According to some implementations, the presentation server 104 may also include, or be communicably coupled with, an e-mail server, a web server, a caching server, a streaming data server, and/or other suitable server(s). In some implementations, components of the presentation server 104 may be distributed in different locations and coupled using the network 108.

In some implementations, the presentation server 104 includes a backend application 112 that performs processing at the presentation server 104 that is needed to support requests for data and user inputs received from the client device 102. For example, the backend application 112 can send data to and process requests received from at least one client application 114 at the client device 102.

The backend application 112 includes a presentation interface module 116, for example, that can prepare data that is to be presented by a presentation module 118 at the client device 102. For example, the presentation interface module 116 can prepare data for presentation based on user inputs received by a communication module 120 and using the data points 110. The presentation interface module 116 is used by the presentation server 104 for communicating with other systems in a distributed environment, connected to the network 108 (e.g., the client device 102), as well as other systems (not illustrated) communicably coupled to the network 108. Generally, the presentation interface module 116 comprises logic encoded in software and/or hardware in a suitable combination and operable to communicate with the network 108. More specifically, the presentation interface module 116 may comprise software supporting one or more communication protocols associated with communications such that the network 108 or interface's hardware is operable to communicate physical signals within and outside of the illustrated environment 100.

Figure 2:
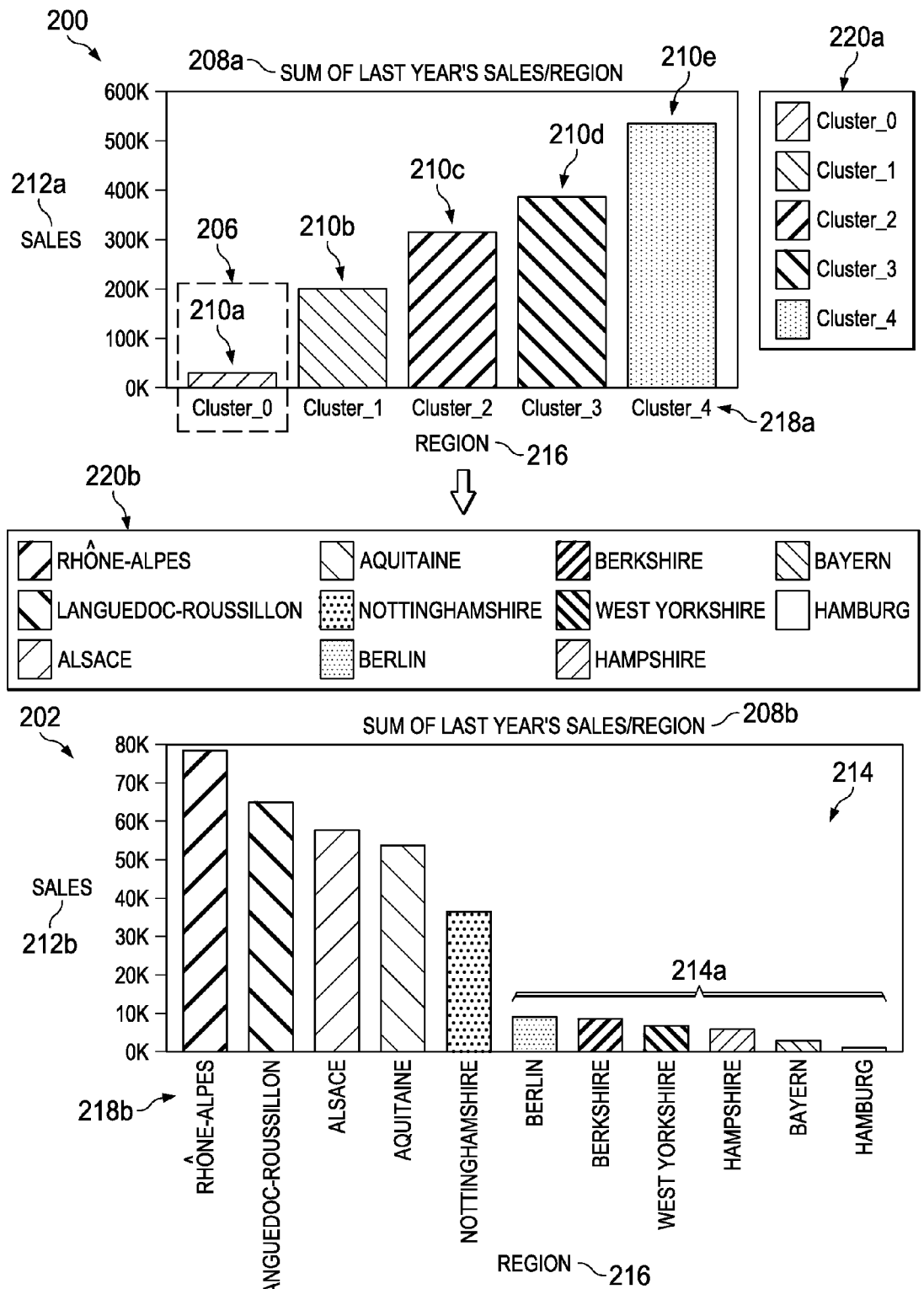
FIG. 2 is a block diagram showing an example transition from a first graph to a second graph.

As will be described below with reference to FIG. 2, the presentation interface module 116, for example, can provide a first graph for presentation, the first graph representing a plurality of groups, each group representing an aggregated set of the data points 110 grouped based on a first set of common attributes. FIG. 2 below provides example graphs that can be presented as the first graph.

The backend application 112 further includes a data analysis module 122 that can analyze an aggregated set of data points represented by a selected group to determine whether the number of aggregated set of data points exceeds a threshold number. If the threshold is not exceeded, for example, then the aggregated set of data points can be used (e.g., as is, without additional grouping) by the presentation interface module 116 for immediate use in preparing a visualization, such as a graph.

The backend application 112 further includes an aggregation module 124 that can be used to re-group the aggregated set of data points, e.g., in response to determining that the number of aggregated set of data points exceeds the threshold number. Re-grouping the aggregated set of data points can include, for example, identifying a second set of common attributes associated with the re-grouped set of data points and aggregating the data points based on the second set of common attributes. As a result of the regrouping, the presentation interface module 116 can provide a second graph for presentation, the second graph representing a plurality of groups, each group representing an aggregated subset of data points from the aggregated set of data points.

The presentation server 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102.

Specifically, the processor 126 executes the functionality required to receive and process requests from the client device 102.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the presentation server 104. In some implementations, memory 128 includes the data points 110 (described above). Other components within the memory 128 are possible.

Each client device 102 of the environment 100 may be any computing device operable to connect to, or communicate with, at least the presentation server 104 via the network 108 using a wire-line or wireless connection. In general, the client device 102 comprises an electronic computer device operable to receive, transmit, process, and store any appropriate data associated with the environment 100 of FIG. 1.

A request handler 130, e.g., included in the backend application 112, can handle requests received from the client device 102. Specifically, the request handler 130 can process data requests or other requests generated by the client application 114 (or its components 118-120). In some implementations, the request handler 130 can also process requests received from other sources in addition to client devices 102, e.g., requests received from external systems 106. The request handler 130 can receive user input selecting a particular group of the plurality of groups that are displayed in a visualization at a given time, such as the graphs shown in FIG. 2 below.

The illustrated client device 102 further includes a processor 132, a memory 134, and an interface 136. The interface 136 is used by the client device 102 for communicating with other systems in a distributed environment—including within the environment 100—connected to the network 108, e.g., the presentation server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the presentation server 104 and to receive and process responses from the presentation server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the presentation server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating a visual representation of a web browser. In particular, the GUI 140 may be used to view and navigate various web pages located both internally and externally to the presentation server 104.

FIG. 2 is a block diagram showing an example transition from a first graph 200 to a second graph 202. For example, the first graph 200, represents a plurality of groups, e.g., cluster_0 through cluster_4. Each group represents an aggregated set of data points grouped based on a first set of common attributes, in this case sales-related data. The first graph 200 can be presented to a user, such as the user 109, in a reporting application, in a standalone application, or in some other way. The second graph 202 can be presented upon a user interaction 206 with the first graph 200, such as when the user selects one of the clusters in order to drill down to lower-level data (or to view data points in a user-selected cluster). For example, for any given cluster in a graph, the user can select (e.g., double click on) the cluster in order to drill down to lower-level data, such as sub-groups of a given group or the underlying data points of a displayed cluster. Additional controls can be provided that allow the user to traverse upward within the hierarchy of the data, e.g., to re-visit the group associated with a current sub-group.

As indicated by a title 208a (e.g., "Sum of Last Year's Sales/Region"), the first graph 200 represents aggregated data points associated with sales by region. The first graph 200 includes clusters 210a-210e (indicated in the first graph 200 as bars in the graph). Each of the clusters 210a-210e is represented in the first graph 200 as a bar, the height of which depends on values of data points in the respective cluster. In some implementations, the height of each bar used for the clusters 210a-210e can be the mean of data points in the cluster. For example, cluster 210a is shown in the first graph 200 as having a height corresponding to sales of approximately 30K on a sales axis 212a. The height of cluster 210a, in this example, can be an average (or other centroid) of the underlying data points, e.g., regional sales values 214, eleven of which averaging to approximately 30K of sales. The remaining clusters 210b-210e are labeled along a region axis 216, e.g., in the first graph 200, serving as the axis along which clusters are presented. Labels 218a identify the names of the clusters. In some implementations, the labels 218a can be generated automatically and assigned sequential numbers, e.g., as suffixes to "Cluster." In some implementations, the labels can include meta-data, e.g., to define ranges of values or other information, that is automatically used as the label based on a pre-defined rules or classification schemes. Alternatively, the automatic meta-data related labels may be determined based on how the values are split, such as illustrated in the second graph 202. In some implementations, the user can override the labels 218a and input other labels to use, e.g., to define a group name.

In some implementations, each of the bars for the clusters 210a-210e can include markings that indicate the number of data points or potential sub-groups for each cluster. For example, the width of the bars for each of the clusters can indicate a relative number of data points in each cluster. In another example, the number of data points can be indicated by displaying the number in the bar representing the cluster or in a legend 220a that identifies the clusters and indicates the colors and/or shading of each cluster in the graph.

The second graph 202, as shown, includes data points, including the regional sales values 214. The bars displayed in the second graph 202 are labeled using region labels 218b, each label identifying a particular region. A legend 220b can also identify the regions by name and indicate colors or shading that are used for each bar, such as if the names of the regions are not included in the region labels 218b. In some implementations, the legend 220a (or the legend 220b) can be omitted, such as the names of the clusters 210a-210e (or the regional sales values 214) appear as labels in the respective graphs. The second graph 202 can include a title 208b that is the same as the title 208a, or the title 208b can include "Cluster_0" or some other text to differentiate the data that is shown in the second graph 202.

In some implementations, as the user drills down in the graphs, units on axes can change, e.g., to scale automatically to the data points that are reflected in the graphs. For example, the sales axis 212a includes 100K sales increments as markings on the axis, such as to include the full range of values for the clusters 210a-210e. Cluster 210e, for example, approaches 540K in sales (e.g., as a mean of data points in that cluster). However, when the second graph 202 is presented relative to cluster 210a data points, a sales axis 212b is marked in 10K sales increments, corresponding to the regional sales values 214. Also, the region axis 216 is used in the second graph 202 to serve as the axis along which regional sales values 214 are presented (as opposed to clusters 210a-210e in the first graph 200).

Figure 3A:
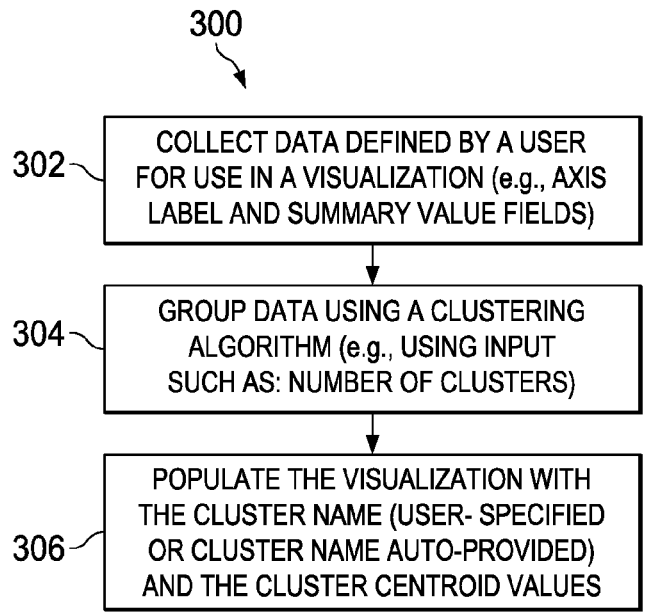
FIG. 3A is a flowchart of an example method for creating an initial graph.

FIG. 3A is a flowchart of an example method 300 for creating an initial graph. For clarity of presentation, the description that follows generally describes method 300 in the context of FIGS. 1-2. However, it will be understood that the method 300 may be performed, for example, by any other suitable system, environment, software, and hardware, or a combination of systems, environments, software, and hardware as appropriate. For example, the presentation server 104 and/or its components can be used to execute the method 300.

At 302, data is collected that is defined by a user for use in a visualization. For example, the data that is collected can include regional sales data associated with the first graph 200. The regional sales data can be data that can be plotted relative to the sales axis 212a and the labels 218a.

At 304, data is grouped using a clustering algorithm. The grouping can occur, for example, using input such as a maximum number of clusters, defined by the user and/or selected automatically. For example, as a result of the grouping, groups representing clusters 210a-210e may be created, such as by using a k-means clustering algorithm or some other clustering algorithm. For example, some clustering algorithms can be based on machine learning, class learning, or some other learning.

At 306, the visualization is populated with the cluster name (user-specified or cluster name auto-provided) and the cluster centroid values. For example, the first graph 200 can be labeled with the title 208a, and the clusters 210a-210e can be labeled with the names of the clusters (e.g., cluster_0 through cluster_4). In some implementations, the user can specify different names for clusters, e.g., by clicking on the cluster names or through other input. Cluster centroid values can also be referred to as "clustroids" and are the values around which the clusters are centered. Clustroids can also be used to determine the dimensions (e.g., bar graph heights) of elements in a visualization (e.g., a graph) and/or used in labeling a corresponding element in a visualization.

Figure 3B:
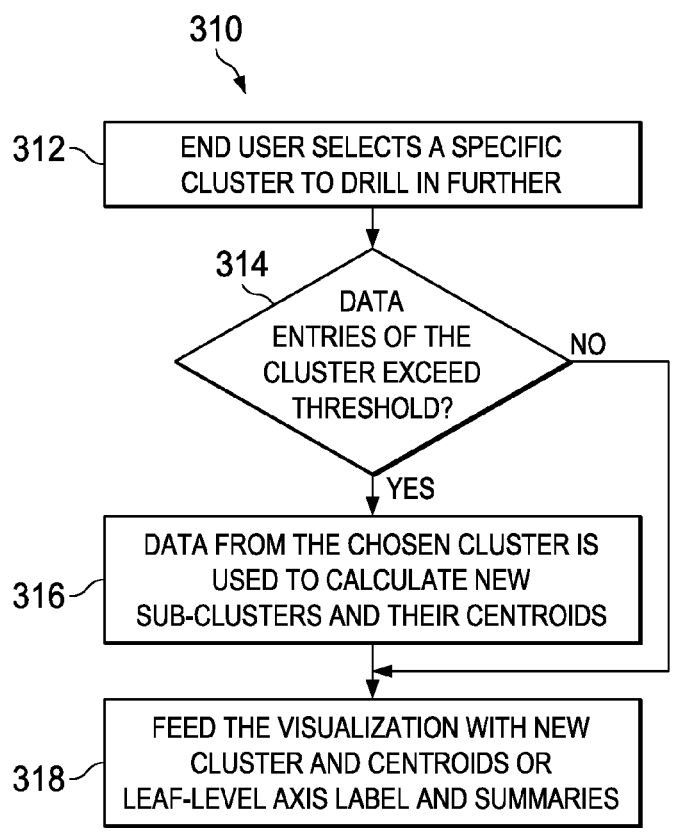
FIG. 3B is a flowchart of an example method for creating an updated graph.

FIG. 3B is a flowchart of an example method 310 for creating an updated graph. For example, the updated graph can be an updated version of any previous graph, such as (but not necessarily) the first graph 200 described above with reference to FIG. 3A. For clarity of presentation, the description that follows generally describes method 310 in the context of FIGS. 1-2. However, it will be understood that the method 310 may be performed, for example, by any other suitable system, environment, software, and hardware, or a combination of systems, environments, software, and hardware as appropriate. For example, the presentation server 104 and/or its components can be used to execute the method 310.

At 312, an end user selects a specific cluster to drill in further. For example, if a chosen data point on the visualization is a group, then it's drillable; if the chosen data point is a leaf node already, then it is not further drillable. As such, the drilling in can be continued till the leaf node is reached.) For example, the user can select the cluster 210a representing cluster_0 that includes the smallest sales volume values among the clusters represented by the clusters 210a-210e.

At 314, a determination is made whether data entries of the cluster exceed a threshold. As an example, based on the user's selection (e.g., using information provided by the client application to the backend application 112), the data analysis module 122 can determine the cluster's size. In the example shown in FIG. 2, the number of data points in cluster_0 is eleven, which may be within the user's threshold for determining whether to create additional sub-groups rather than to provide the data.

At 316, data from the chosen cluster is used to calculate new sub-clusters and their centroids. For example, if the determination at step 314 is made that the data entries of the cluster exceed the threshold, the aggregation module 124 can determine another set of clusters, e.g., using sub-groups of the data points that make up cluster_0. The aggregation module 124 can also determine new centroids for each cluster, e.g., average values that represent an average of the values of the data points in the cluster.

At 318, the visualization is populated with a new cluster and centroids or leaf-level axis labels and summaries. If, for example, step 316 was executed (meaning additional sub-clusters and their centroids have been determined), then the visualization that is presented can be a graph that may resemble the first graph 200, having graph bars that represent clusters. However, if data entries of the cluster did not exceed the threshold at step 314, then the visualization that is presented can be the second graph 202 that includes the data points on cluster_0, as shown in FIG. 2.

Figure 4:
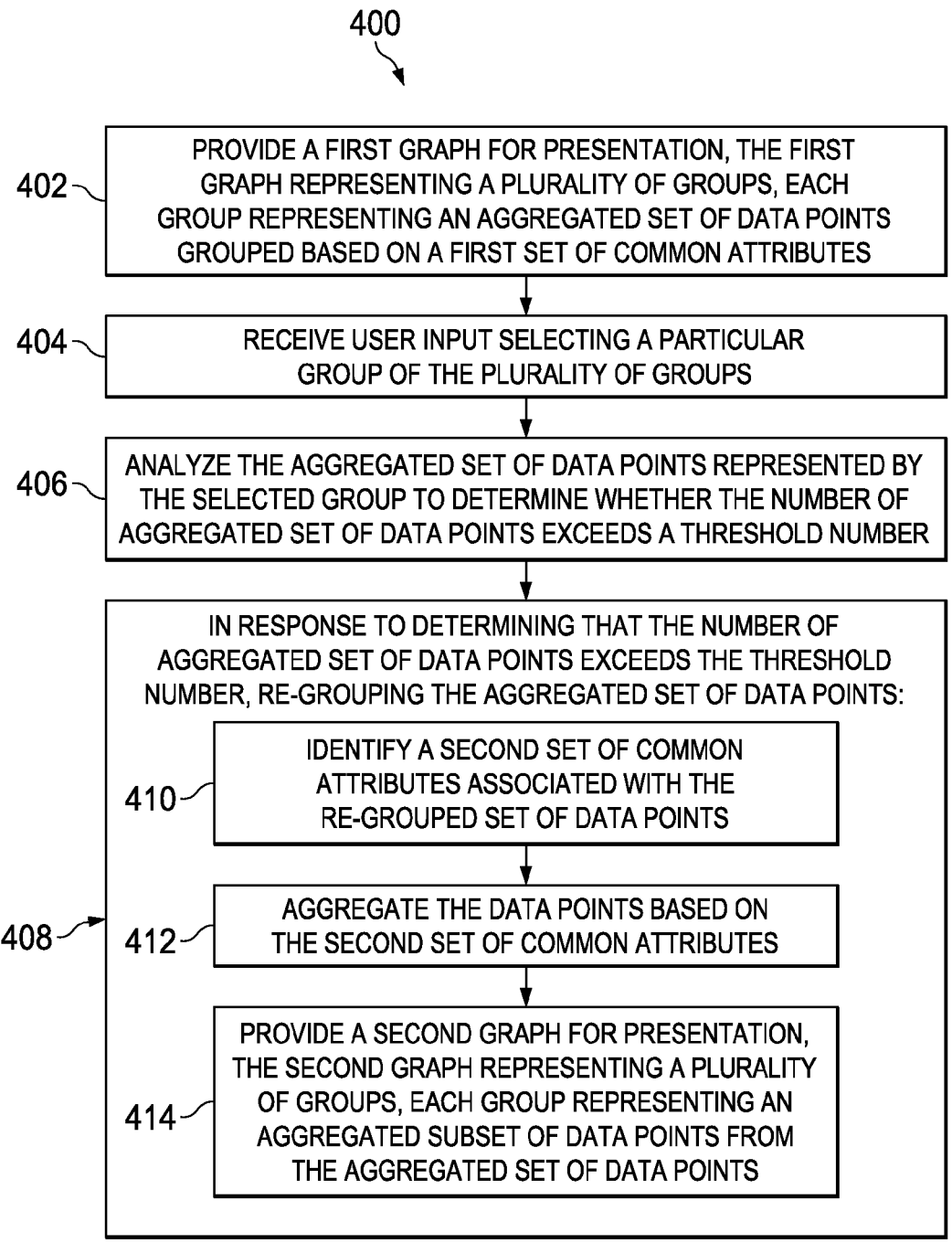
FIG. 4 is a flowchart of an example method for presenting information.

FIG. 4 is a flowchart of an example method 400 for presenting information. For clarity of presentation, the description that follows generally describes method 400 in the context of FIGS. 1-2. However, it will be understood that the method 400 may be performed, for example, by any other suitable system, environment, software, and hardware, or a combination of systems, environments, software, and hardware as appropriate. For example, the client device 102 and the presentation server 104 and/or their components can be used to execute the method 400.

At 402, a first graph is presented for presentation. The first graph represents a plurality of groups, each group representing an aggregated set of data points grouped based on a first set of common attributes. For example, at the presentation server 104, the presentation interface module 116 can prepare data for presenting a graph and provide instructions for presenting the data to the client device 102. The first graph that is presented can be, for example, the first graph 200 that the user 109 views on the client device 102.

In some implementations, the first graph is generated based on a set of data points, wherein the data points are aggregated based on a first grouping algorithm, and wherein aggregating the values based on the second set of common attributes is based on a second grouping algorithm different than the first, the method further comprising generating initial information, including: generating initial information based on an underlying data set; and using a user-defined clustering algorithm or a default algorithm to cluster data points in the underlying data set. For example, the presentation interface module 116 can prepare the data using information from the data points 110. Aggregation, for example, can occur such that the data points are grouped by the clusters 210a-210e, such as by sales, by region. In some implementations, an initial algorithm used by the aggregation module 124 to aggregate the data (e.g., for use in the first graph 200) may be different than subsequent algorithms that are used (e.g., for use in the second graph 202).

In some implementations, at least one group of the plurality of groups includes a set of outliers as compared to the other groups. As an example, because clusters 210a and 210e represent the groups of values having, respectively, the lowest and highest regional sales, the clusters 210a and 210e may include sets of outlier values, such as very low and very high sales, respectively. Low regional sales values 214a, for example, can include a number of (e.g., six) values that are extremely low in relation to other regional sales value, not only in the cluster 210a, but also in the higher-sales-value clusters of the clusters 210b-210e. The cluster 210e may also have outliers, such as values of data points that are significantly higher than the other values. In some implementations, the user can be presented with controls and/or tools for discovering and/or presenting outlier values, such as in a graph separate from the first graph 200 and the second graph 202. In some implementations, separate clusters can be formed to include only outlier values, and the clusters can be labeled as such in order to facilitate data mining or data discovery.

At 404, user input selecting a particular group of the plurality of groups is received. For example, the user 109 can provide the user interaction 206, such as selecting the cluster 210a from among the clusters 210a-210e.

At 406, the aggregated set of data points represented by the selected group is analyzed to determine whether the number of aggregated set of data points exceeds a threshold number. The data analysis module 122, for example, can analyze the data points associated with the cluster 210a to determine if additional clusters (e.g., sub-groups) are to be identified, or as is the case in the second graph 202, the data points are significantly few in number so as not to exceed the threshold but allowing immediate display in the second graph 202.

In some implementations, the threshold number of data points is a pre-determined number of values or an optimized group number determined by an algorithm and using the data points. For example, the threshold number can be a pre-determined setting that is used as a default for multiple users and may depend on the type or complexity of information in the groups determined from the data points. In another example, users can provide information used for settings, such as along the lines of "I only want to see, at any one time, up to N different groups and up to M different data points."

At 408, in response to determining that the number of aggregated set of data points exceeds the threshold number, the aggregated set of data points is re-grouped. For example, the aggregation module 124 can aggregate the data points associated with the cluster 210a to generate sub-groups needed for the second graph 202. In some implementations, re-grouping the aggregated set of data points can include the following sub-steps 410-414.

At 410, a second set of common attributes associated with the re-grouped set of data points is identified. For example, the aggregation module 124 can determine that the common attributes associated with sub-groups to be used in aggregation include data points having particular ranges of values (e.g., low regional sales totals).

In some implementations, the second set of common attributes is different than the first set of common attributes. For example, aggregation need not occur relative to regional sales, but instead can occur for other common attributes, such as by sales team rather than sales region.

At 412, the data points are aggregated based on the second set of common attributes. For example, the aggregation module 124 can aggregate the data points in the current data set using the particular common attributes, e.g., sales region, sales team, or some other attributes.

In some implementations, controls available to the user can allow the user to choose which common attributes are to be used for aggregation, such as displaying information to the user that aggregation can produce five distinct sub-groups based on sales team, or eleven sub-groups based on sales region.

In some implementations, aggregating the set of data points includes aggregating the set of data points based on one or more clustering algorithms. For example, the aggregation module 124 can use any of various clustering algorithms, depending on the situation. Selection of a particular clustering algorithm to be used can be based on, for example, user settings, whether the graph to be presented is initial or subsequent, the number of data points in a given cluster, or other factors.

In some implementations, the one or more clustering algorithms are selected from the following example clustering algorithms. For example, a k-means clustering algorithm can be used, such as a Bradley-Fayyad-Reina (BFR) algorithm or some other k-means clustering algorithm for large data sets. In another example, a mean values clustering algorithm can be used, such as including clustering centered on a centroid. Other values that can be used for the centroids include low values, high values, weighted values, and median values. In another example, a common attributes clustering algorithm can be used, including grouping data points by a common attribute (e.g., termed a "clustroid").

At 414, a second graph is provided for presentation, the updated graph representing a plurality of groups, each group representing an aggregated subset of data points from the aggregated set of data points. For example, the second graph 202 including the regional sales values 214 can be presented on the client device 102.

In some implementations, each group of the plurality of groups in the second graph includes a distinct subset of the data points, including identifying each subset using one or more of a logical division of the data points, a certain number of data points, or a maximum number of data points. For example, the aggregation module 124 can cluster the data points into sub-groups that are determined by specific ranges of values (e.g., to break the data points into specific ranges, such as date-related values or along round numbers). The aggregation module 124 can cluster the data points so that a maximum number of sub-groups is not exceeded or so that a maximum number of (e.g., un-grouped) data points is not presented. Aggregation can also occur, for example, so that logical breaks in the data points are preserved, or so that a specific type of distribution (e.g., bell distribution) is achieved by resulting sub-groups.

In some implementations, the method 400 further includes, in response to determining that the number of aggregated set of data points does not exceed the threshold number, providing an updated graph for presentation, the second graph representing the data points associated with the selected particular group. For example, the second graph 202 can be presented that includes the regional sales values 214.

In some implementations, the method 400 further includes a dynamic update, e.g., including the following steps. An indication is received that a first group in the second graph is selected, e.g., that the user has selected a sub-group that is a subset of the cluster 210b. Changes to data points included in the first group are identified after presentation of the second graph, such as if a value changes in one of the data points 110 corresponding to the user-selected sub-group of the cluster 210b. Parameters of the first group are updated based on the changes. A third graph is provided for presentation, the third graph based on the second graph, modified using the updated parameters. For example, after the user has selected a first group, any new additions to the data points in the first group are reflected by updating the parameters of the selected group.

Figure 5:
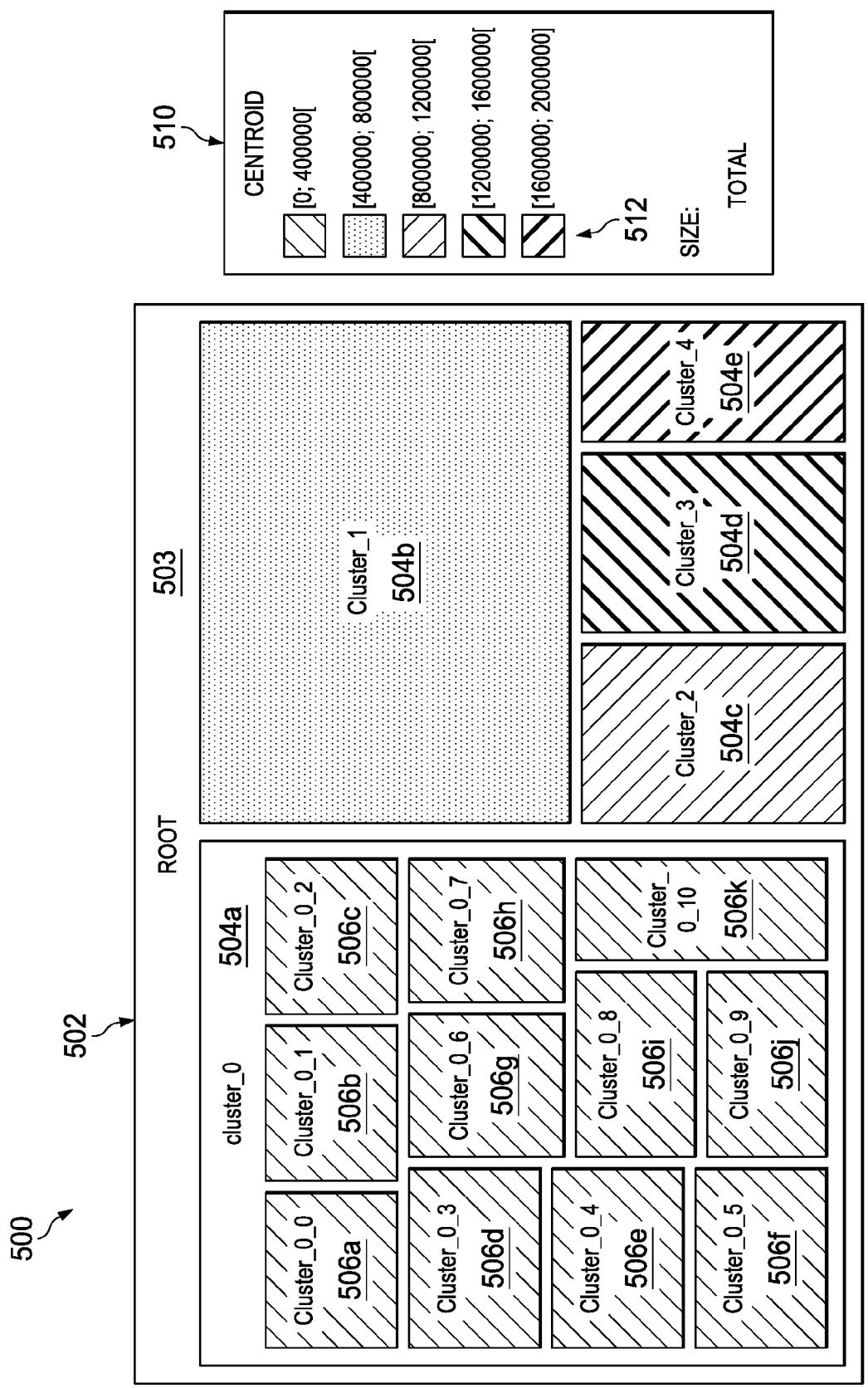
FIG. 5 shows an example hierarchical view of clustered information.

FIG. 5 shows an example hierarchical view 500 of clustered information. For example, the hierarchical view 500 can be an alternative to the visualizations provided by the first graph 200 and the second graph 202 described above. The hierarchical view 500 includes a graph area 502, the entirety of which represents all of the data points beginning at a root level 503. The graph area 502 includes regions 504a-504e, e.g., that correspond to the clusters 210a-210e described above with reference to FIG. 2. The regions 504a-504e are sub-regions of the region identified at the root level 503. The regions 504a-504e are labeled with default cluster names cluster_0 through cluster_4, but user-defined labels or labels including meta-data can be used.

In some implementations, the hierarchical view 500 can be interactive, e.g., to allow the user to drill down to additional information. For example, user selection of the region 504a can result in a display of sub-regions 506a-506k, each corresponding to a sub-group or cluster within in the cluster_0 represented by the region 504a. As shown in FIG. 5, the sub-regions 506a-506k are labeled with cluster names cluster_0_0 through cluster_0_10, e.g., corresponding to regional sales values 214.

In some implementations, a legend 510 can include meta-data associated with information displayed in the hierarchical view 500. For example, the legend 510 can include ranges of values that correspond to regions in the graph area 502. Indicators 512 can include colors, shading or other visual markings that map the information in the legend 510 to particular regions in the hierarchical view 500.

Some or all of the sub-regions 506a-506k may include further sub-regions of their own, or may terminate in data values. Similarly, when sub-regions 506a-506k represent data values, labels used in the sub-regions 506a-506k can include labels that identify specific values or groups of values (e.g., corresponding to the region labels 218b). For example, labels can be created in order to clarify how clusters are different from each other.

In some implementations, the user can use controls to alternately switch a presentation from graphs described with reference to FIG. 2 to the hierarchical view 500. For example, the user may initially start using the hierarchical view 500, then use the first graph 200 and ultimately the second graph 202 in order to display, traverse and comprehend the data.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulate data to perform the operations of various components. Specifically, each processor can execute the functionality required to send requests and/or data to components of the environment and to receive data from the components of the environment, such as in communications between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method, comprising:
providing a first graph for presentation, the first graph representing a plurality of groups, each group representing an aggregated set of data points grouped based on a first set of common attributes;
receiving user input selecting a particular group of the plurality of groups;
analyzing the aggregated set of data points represented by the selected group to determine whether the number of aggregated set of data points exceeds a threshold number; and
in response to determining that the number of aggregated set of data points exceeds the threshold number, re-grouping the aggregated set of data points, wherein re-grouping the aggregated set of data points includes:
receiving user input identifying a maximum number of groups and a maximum number of data points in each group;
identifying a second set of common attributes different from the first set of common attributes and associated with the re-grouped set of data points;
aggregating the data points based on the second set of common attributes and further based on the maximum number of groups and a maximum number of data points in each group; and
providing a second graph for presentation, the second graph representing a plurality of groups, each group representing an aggregated subset of data points from the aggregated set of data points.

2. The method of claim 1, wherein the threshold number of data points is a pre-determined number of values or an optimized group number determined by an algorithm and using the data points.

3. The method of claim 1, further including:
in response to determining that the number of aggregated set of data points does not exceed the threshold number, providing an updated graph for presentation, the second graph representing the data points associated with the selected particular group.

4. The method of claim 1, wherein aggregating the set of data points includes aggregating the set of data points based on one or more clustering algorithms.

5. The method of claim 4, wherein the one or more clustering algorithms are selected from a group comprising:
a k-means clustering algorithm;
a mean values clustering algorithm, including clustering centered on a centroid; and
a common attributes clustering algorithm, including grouping data points by a common attribute.

6. The method of claim 1, wherein each group of the plurality of groups in the second graph includes a distinct subset of the data points, including identifying each subset using one or more of a logical division of the data points, a certain number of data points, or a maximum number of data points.

7. The method of claim 1, wherein at least one group of the plurality of groups includes a set of outliers as compared to the other groups.

8. The method of claim 1, further comprising a dynamic update, including:
receiving an indication that a first group in the second graph is selected;
identifying changes to data points included in the first group after presentation of the second graph;
updating parameters of the first group based on the changes; and
providing a third graph for presentation, the third graph based on the second graph, modified using the updated parameters.

9. The method of claim 1, wherein the first graph is generated based on a set of data points, wherein the data points are aggregated based on a first grouping algorithm, and wherein aggregating the values based on the second set of common attributes is based on a second grouping algorithm different than the first, the method further comprising generating initial information, including:
generating initial information based on an underlying data set; and
using a user-defined clustering algorithm or a default algorithm to cluster data points in the underlying data set.

10. A system comprising:
memory operable to store content, including static and dynamic content; and
at least one hardware processor interoperably coupled to the memory and operable to perform instructions to:
provide a first graph for presentation, the first graph representing a plurality of groups, each group representing an aggregated set of data points grouped based on a first set of common attributes;
receive user input selecting a particular group of the plurality of groups;
analyze the aggregated set of data points represented by the selected group to determine whether the number of aggregated set of data points exceeds a threshold number; and
in response to determining that the number of aggregated set of data points exceeds the threshold number, re-group the aggregated set of data points, wherein re-grouping the aggregated set of data points includes:
receiving user input identifying a maximum number of groups and a maximum number of data points in each group;
identifying a second set of common attributes different from the first set of common attributes and associated with the re-grouped set of data points;
aggregating the data points based on the second set of common attributes and further based on the maximum number of groups and a maximum number of data points in each group; and
providing a second graph for presentation, the second graph representing a plurality of groups, each group representing an aggregated subset of data points from the aggregated set of data points.

11. The system of claim 10, wherein the threshold number of data points is a pre-determined number of values or an optimized group number determined by an algorithm and using the data points.

12. The system of claim 10, further including instructions to:
in response to determining that the number of aggregated set of data points does not exceed the threshold number, provide an updated graph for presentation, the second graph representing the data points associated with the selected particular group.

13. The system of claim 10, wherein the one or more clustering algorithms are selected from a group comprising:
a k-means clustering algorithm;
a mean values clustering algorithm, including clustering centered on a centroid; and
a common attributes clustering algorithm, including grouping data points by a common attribute.

14. The system of claim 10, wherein each group of the plurality of groups in the second graph includes a distinct subset of the data points, including identifying each subset using one or more of a logical division of the data points, a certain number of data points, or a maximum number of data points.

15. The system of claim 10, wherein at least one group of the plurality of groups includes a set of outliers as compared to the other groups.

16. The system of claim 10, further comprising a dynamic update, including instructions to:
   receive an indication that a first group in the second graph is selected;
   identify changes to data points included in the first group after presentation of the second graph;
   update parameters of the first group based on the changes; and
   provide a third graph for presentation, the third graph based on the second graph, modified using the updated parameters.

17. The system of claim 10, wherein the first graph is generated based on a set of data points, wherein the data points are aggregated based on a first grouping algorithm, and wherein aggregating the values based on the second set of common attributes is based on a second grouping algorithm different than the first, the instructions further comprising instructions for generating initial information, including:
   generating initial information based on an underlying data set; and
   using a user-defined clustering algorithm or a default algorithm to cluster data points in the underlying data set.

18. A computer-readable media, comprising computer-readable instructions embodied on tangible, non-transitory media, the instructions operable when executed by at least one computer to:
   provide a first graph for presentation, the first graph representing a plurality of groups, each group representing an aggregated set of data points grouped based on a first set of common attributes;
   receive user input selecting a particular group of the plurality of groups;
   analyze the aggregated set of data points represented by the selected group to determine whether the number of aggregated set of data points exceeds a threshold number; and
   in response to determining that the number of aggregated set of data points exceeds the threshold number, re-group the aggregated set of data points, wherein re-grouping the aggregated set of data points includes:
      receiving user inputs identifying a second set of common attributes different from the first set of common attributes and associated with the re-grouped set of data points, the user inputs further including a number of sub-groups to be used for aggregating;
      aggregating the data points based on the second set of common attributes and the number of sub-groups identified by the user; and
      providing a second graph for presentation, the second graph representing a plurality of groups, each group representing an aggregated subset of data points from the aggregated set of data points.

* * * * *